(12) United States Patent
Drueke et al.

(10) Patent No.: US 10,193,317 B2
(45) Date of Patent: Jan. 29, 2019

(54) ELECTRICAL SYSTEM AND SWITCHING ASSEMBLY THEREFOR

(71) Applicant: EATON CORPORATION, Cleveland, OH (US)

(72) Inventors: Christopher Emmons Drueke, Lansing, MI (US); Paul Seff, Williamsburg, VA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/384,629

(22) Filed: Dec. 20, 2016

(65) Prior Publication Data

US 2018/0175597 A1 Jun. 21, 2018

(51) Int. Cl.
| | |
|---|---|
| *H02G 3/00* | (2006.01) |
| *H02G 3/08* | (2006.01) |
| *H01H 71/08* | (2006.01) |
| *H01H 71/02* | (2006.01) |
| *H02G 3/10* | (2006.01) |

(52) U.S. Cl.
CPC ............ *H02G 3/081* (2013.01); *H01H 71/02* (2013.01); *H01H 71/08* (2013.01); *H02G 3/088* (2013.01); *H02G 3/10* (2013.01)

(58) Field of Classification Search
CPC .......... H02G 3/00; H02G 3/0431; H02G 3/08; H02G 3/10; H02G 3/12; H02G 3/18; H02G 3/14; H02G 3/086; H02G 3/081; H02G 3/088; H02B 1/40; H01H 9/02; H01H 9/0271; H01H 71/08; H01H 71/02; H05K 5/00; H05K 5/0026; H05K 5/0069; B60R 16/0239; H01L 23/047
See application file for complete search history.

(56) References Cited

U.S. PATENT DOCUMENTS

| | | | | | |
|---|---|---|---|---|---|
| 2,603,546 | A | * | 7/1952 | Lais ........................ | H02B 1/50 220/3.8 |
| 4,079,439 | A | * | 3/1978 | Coles ..................... | H02B 1/056 174/70 B |
| 4,307,436 | A | * | 12/1981 | Eckart ..................... | H02B 1/50 174/38 |
| 4,546,418 | A | * | 10/1985 | Baggio .................... | H02B 1/50 361/652 |
| 4,785,376 | A | * | 11/1988 | Dively ..................... | H02B 1/50 137/356 |
| 5,239,129 | A | * | 8/1993 | Ehrenfels ................. | H02B 1/28 174/50 |
| 5,722,847 | A | * | 3/1998 | Haag ................... | H01R 13/6395 439/314 |
| 5,784,249 | A | * | 7/1998 | Pouliot ................ | H02G 3/0493 174/68.1 |
| 6,504,268 | B1 | * | 1/2003 | Flegel ..................... | H02B 1/50 174/59 |

(Continued)

*Primary Examiner* — Pete T Lee
(74) *Attorney, Agent, or Firm* — Eckert Seamans (57) ABSTRACT

A switching assembly includes an enclosure member, a backpan coupled to the enclosure member, an electrical switching apparatus coupled to the enclosure member, and an electrical receptacle electrically connected to the electrical switching apparatus. The enclosure member, the backpan, the electrical switching apparatus, and the electrical receptacle are structured so as to form a self-contained sub-assembly.

15 Claims, 6 Drawing Sheets

(56) References Cited

U.S. PATENT DOCUMENTS

| | | | | |
|---|---|---|---|---|
| 6,885,564 B2* | 4/2005 | Hockett | ................ | G06F 1/181 |
| | | | | 174/50 |
| 8,395,885 B2* | 3/2013 | Maloney | ................ | H02B 1/056 |
| | | | | 361/627 |
| 2010/0186982 A1* | 7/2010 | Gates | ................ | H01R 13/508 |
| | | | | 174/50 |
| 2013/0153375 A1* | 6/2013 | Yang | ................ | H01H 9/20 |
| | | | | 200/43.16 |
| 2015/0124376 A1* | 5/2015 | Morita | ................ | H02B 1/22 |
| | | | | 361/611 |

* cited by examiner

ELECTRICAL SYSTEM AND SWITCHING ASSEMBLY THEREFOR

BACKGROUND

Field

The disclosed concept pertains to electrical systems. The disclosed concept also pertains to switching assemblies such as, for example, switching assemblies including electrical switching apparatus.

Background Information

Electrical systems commonly include electrical switching apparatus such as, for example, circuit breakers. Circuit breakers are used to protect electrical circuitry (e.g., without limitation, electrical receptacles) from damage due to an overcurrent condition, such as an overload condition or a relatively high level short circuit or fault condition. Electrical systems including a circuit breaker and an electrical receptacle commonly have the electrical receptacle wired to a central bus bar connection that a customer interface connects with. However, such electrical systems often have the circuit breaker wired on both the line side and the load side, a process requiring time consuming factory connections to be made.

There is, therefore, room for improvement in electrical systems and in switching assemblies therefor.

SUMMARY

These needs and others are met by embodiments of the disclosed concept, which are directed to an electrical system and switching assembly therefor.

In accordance with one aspect of the disclosed concept, a switching assembly includes an enclosure member, a backpan coupled to the enclosure member, an electrical switching apparatus coupled to the enclosure member, and an electrical receptacle electrically connected to the electrical switching apparatus. The enclosure member, the backpan, the electrical switching apparatus, and the electrical receptacle are structured so as to form a self-contained subassembly.

In accordance with another aspect of the disclosed concept, an electrical system including a first customer interface, a second customer interface, and the aforementioned switching assembly is provided.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

Figure 1:
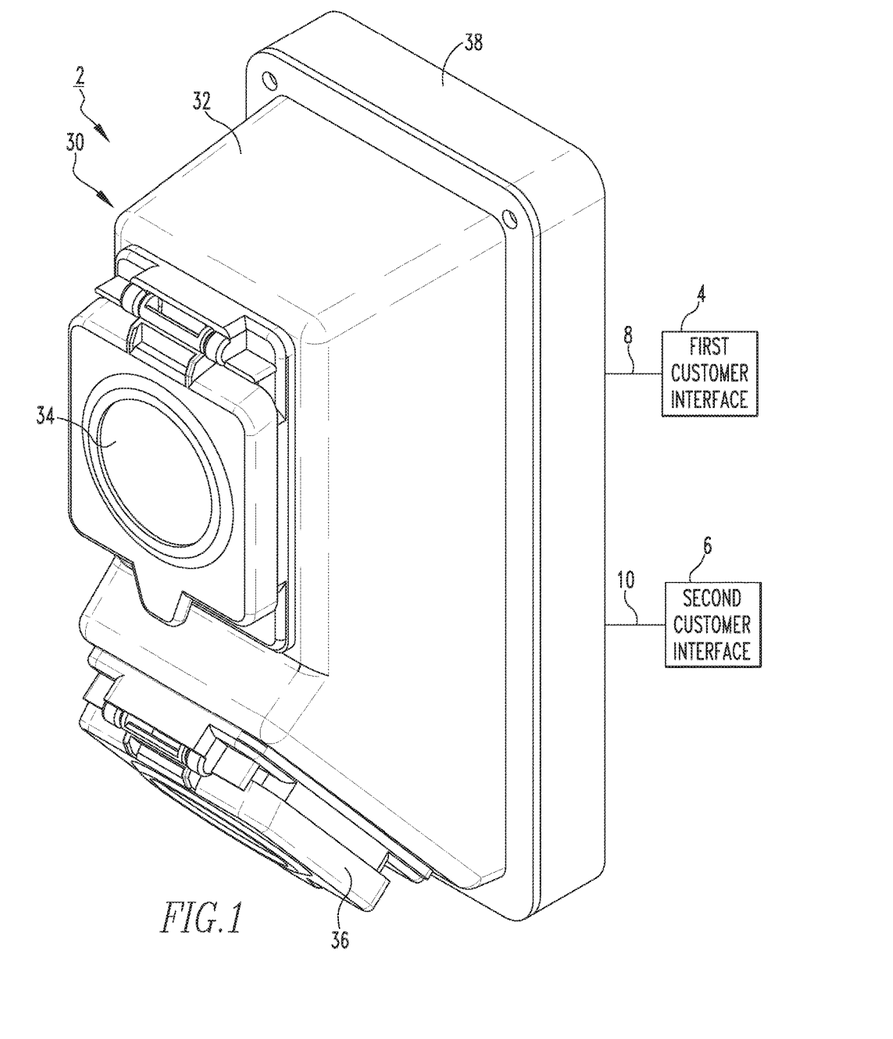
FIG. 1 is a partially simplified isometric view of an electrical system and switching assembly therefor, in accordance with a non-limiting embodiment of the disclosed concept.
Figure 2:
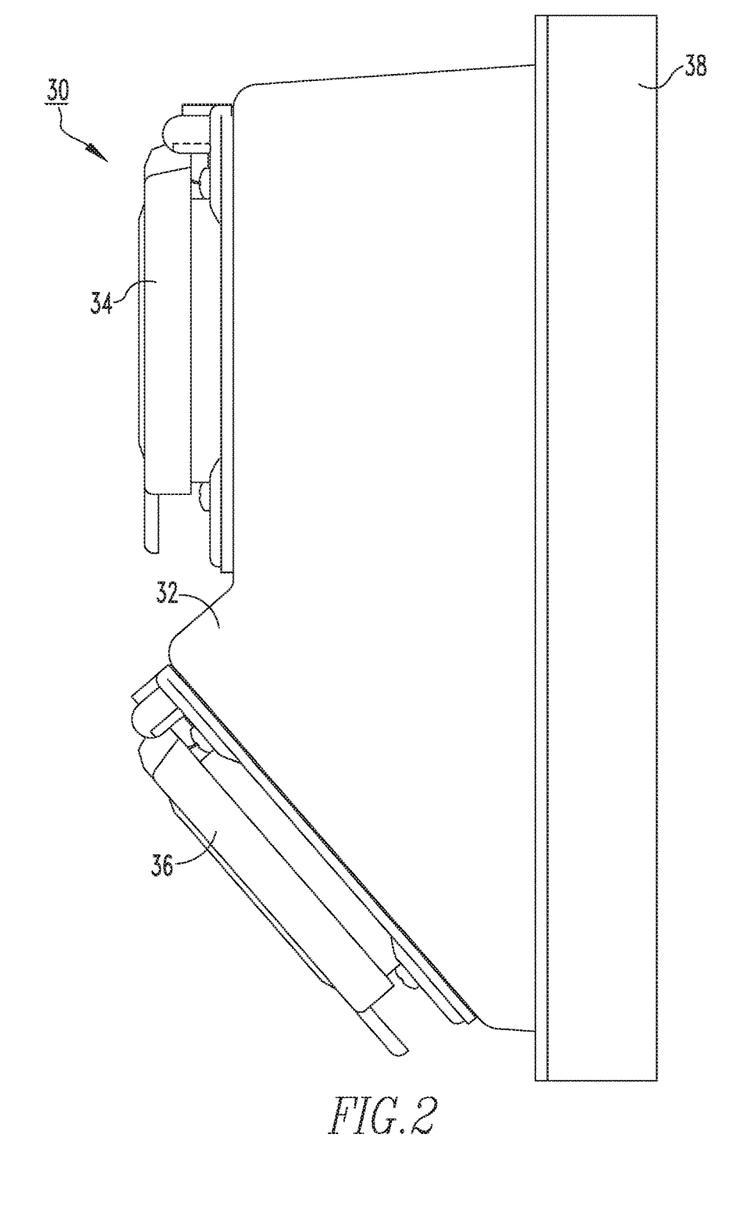
FIG. 2 is a side elevation view of the switching assembly of FIG. 1.
Figure 3:
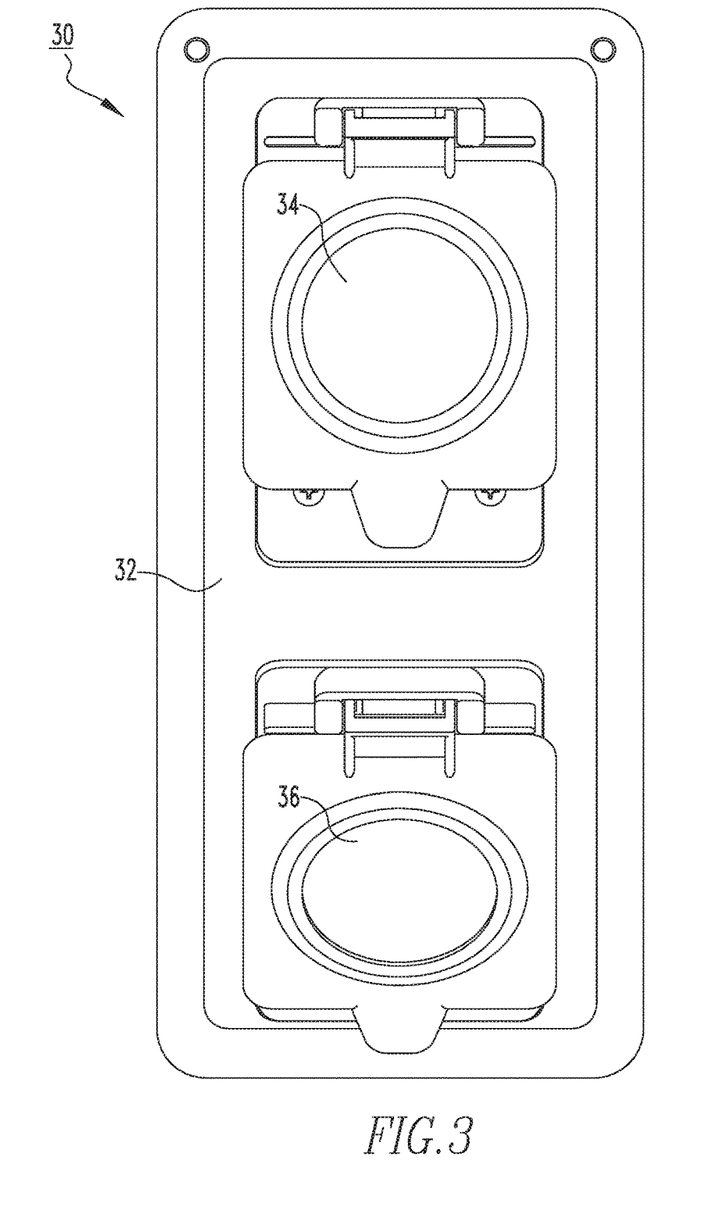
FIG. 3 is a front elevation view of the switching assembly of FIG. 2.

FIG. 1 is a simplified view of an example electrical system 2, in accordance with one non-limiting embodiment of the disclosed concept. The example electrical system 2 includes a first customer interface 4 (e.g., without limitation, a mechanical lug or stud), a second customer interface 6 (e.g., without limitation, a feeder panel), a number of conductors 8,10 each electrically connected with a corresponding one of the customer interfaces 4,6, and a novel switching assembly 30. The example switching assembly 30 includes an enclosure member 32, a number of door members 34,36 each pivotably connected with the enclosure member 32, and a backpan 38 coupled to the enclosure member 32. The enclosure member 32 and the door members 34,36 are preferably molded members, and in one example embodiment are made of a polycarbonate material. The backpan 38 is preferably made of a suitable metallic material.

Figure 4:
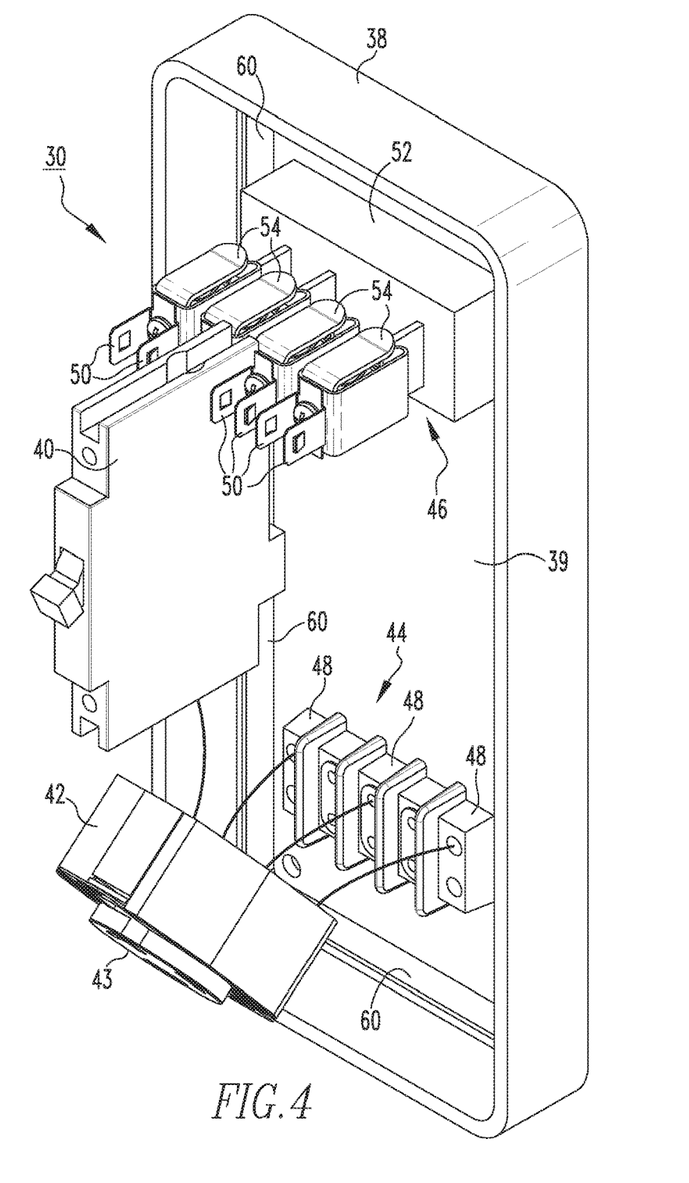
FIG. 4 is an isometric view of a portion of the switching assembly of FIG. 3, shown without the enclosure member.

FIGS. 2-6 show different views of the switching assembly 30. Referring to FIG. 4, the switching assembly 30 further includes an electrical switching apparatus (e.g., without limitation, one-pole circuit breaker 40) coupled to the enclosure member 32, an electrical receptacle (e.g., without limitation, twist-lock marine receptacle 42) electrically connected to the circuit breaker 40, a number of bussing assemblies 44,46, and an annular-shaped gasket member 60. The first door member 34 (FIGS. 1-3) overlays the circuit breaker 40 in order to provide access thereto and provide protection against moisture ingress. The second door member 36 (FIGS. 1-3) overlays the marine receptacle 42 in order to provide access thereto and provide protection against moisture ingress. As will be discussed in greater detail below, the components of the switching assembly 30 (e.g., without limitation, the enclosure member 32, the backpan 38, the circuit breaker 40, and the marine receptacle 42) are structured so as to form a self-contained subassembly. As a result, installation of the switching assembly 30 into the electrical system 2, and/or a similar suitable alternative electrical system (not shown), generally only requires connection of the conductors 8,10 to the switching assembly 30.

Continuing to refer to FIG. 4, the first bussing assembly 44 includes a number of bus members 48 mechanically coupled to a mounting surface 39 of the backpan 38, and electrically connected to the marine receptacle 42. The second bussing assembly 46 includes a number of bus members (e.g., without limitation, six of eight stabs 50 are shown and indicated), a bus block 52, and a number of jaw members 54. The bus block 52 is coupled to the mounting surface 39. In the exemplary embodiment, the jaw members 54 are each mechanically coupled to two corresponding stabs 50. It will, however, be appreciated that similar suitable alternative bussing assemblies (not shown) may have alternative configurations and/or arrangements, without departing from the scope of the disclosed concept. Additionally, the circuit breaker 40 in the exemplary embodiment is advantageously mechanically coupled and electrically connected with one of the stabs 50 by a plug-on connection. That is, the circuit breaker 40 is not wired to the bussing assembly 46, but rather is plugged onto one of the stabs 50. It will be appreciated that a suitable alternative circuit breaker (e.g., without limitation, a multi-pole circuit breaker, not shown) may be employed in the switching assembly 30 in place of the circuit breaker 40, without departing from the scope of the disclosed concept.

Accordingly, assembly and operation of the switching assembly 30 is significantly simplified, as compared to prior art switching assemblies (not shown). More specifically, prior art electrical systems (not shown) including electrical switching apparatus and electrical receptacles require time consuming wiring at multiple ends of the electrical switching apparatus, whereas the circuit breaker 40 can quickly and easily be coupled and installed into the switching assembly 30 by simply plugging onto one of the stabs 50. As a result, the circuit breaker 40 can also be quickly and easily changed out (i.e., simply removed or unplugged from one of the stabs 50) of the switching assembly for another circuit breaker (not shown) in the event that such a new circuit breaker is desired.

Figure 5:
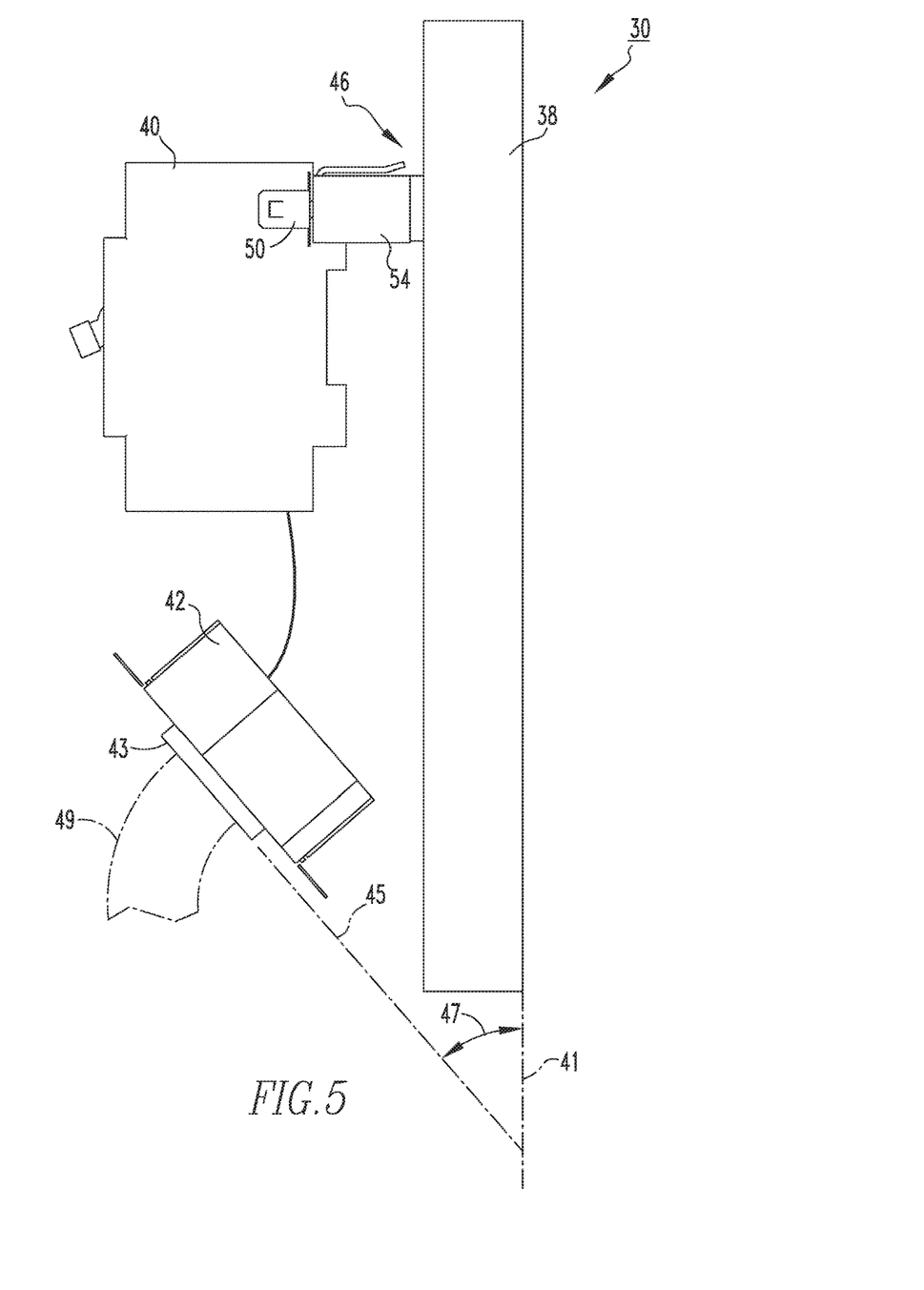
FIG. 5 is a side elevation view of the portion of the switching assembly of FIG. 4.

The configuration of the switching assembly 30 also provides beneficial strain relief to an electrical conductor (e.g., without limitation, a cable 49, partially shown in simplified form in FIG. 5) plugging into the marine receptacle 42. It will be appreciated that the mounting surface 39 of the backpan 38 is generally located in a plane (see, for example, plane 41, shown in FIG. 5). Furthermore, the marine receptacle 42 includes an interface surface 43 (i.e., a generally planar surface for engaging and interfacing with the incoming cable 49) located in another plane 45. The planes 41,45 are located at an angle 47, which is preferably between 30 degrees and 60 degrees with respect to each other. In this manner, the cable 49 advantageously experiences a relatively small amount of bend, as compared with a prior art switching assembly configuration (not shown) in which a cable would have to bend 90 degrees upon exiting an electrical receptacle. As a result, the life of the cable 49 is advantageously able to be lengthened.

Figure 6:
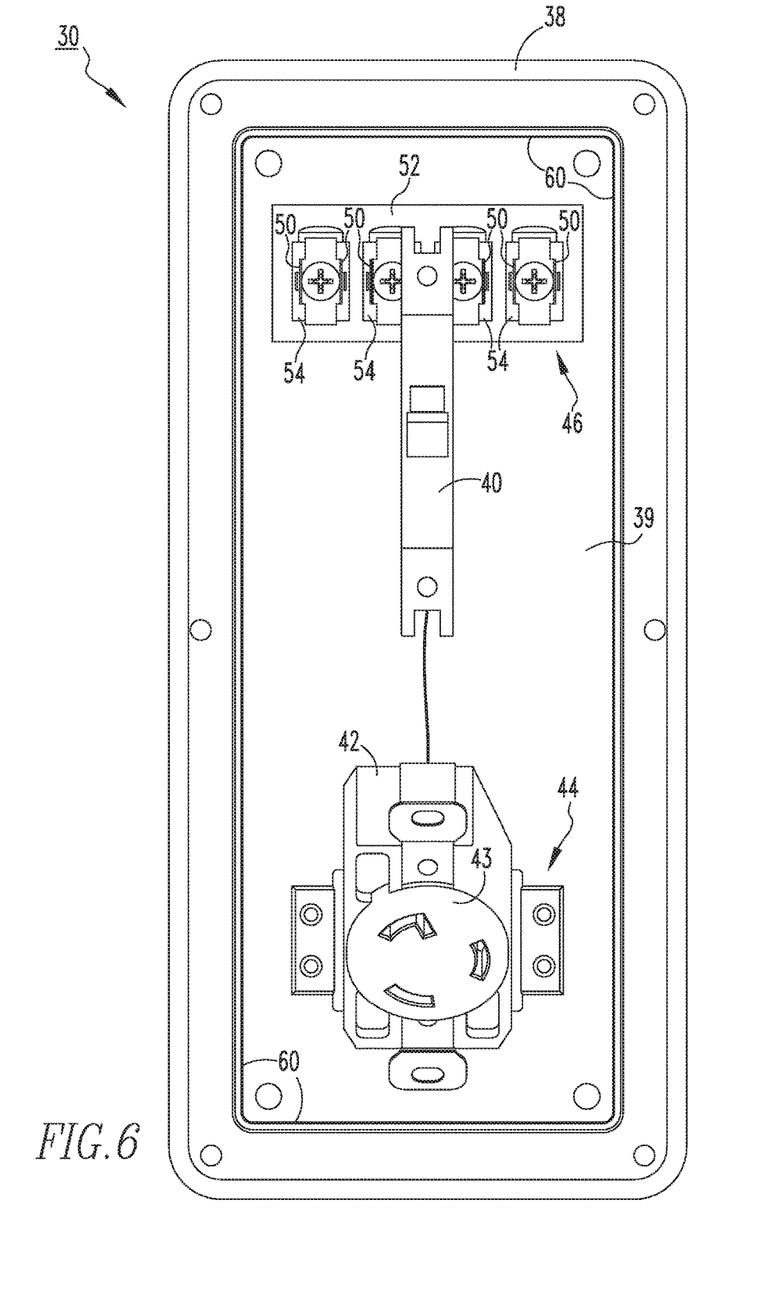
FIG. 6 is a front elevation view of the portion of the switching assembly of FIG. 4.

Additionally, the switching assembly 30 provides a mechanism to protect the internal electrical components (e.g., the circuit breaker 40, the marine receptacle 42, and the bussing assemblies 44,46) from undesirable and potentially damaging exposure to moisture (e.g., without limitation, water near a loading dock in a shipyard). As shown in FIG. 6, the single gasket member 60 extends along the entire periphery of the mounting surface 39 such that the first and second bussing assemblies 44,46 are located internal with respect to the gasket member 60. Furthermore, the gasket member 60 engages the enclosure member 32 (FIGS. 1-3) and the backpan 38 in order to provide a seal therebetween. As such, the gasket member presents a barrier for undesirable ingress of moisture into the switching assembly 30 between the enclosure member 32 (FIGS. 1-3) and the backpan 38. In one example embodiment, the gasket member is made of a rubber material, although it will be appreciated that other suitable sealing materials are contemplated by the disclosed concept.

As mentioned above, the enclosure member 32, the backpan 38, the circuit breaker 40, the marine receptacle 42, and the bussing assemblies 44,46 are structured so as to form a self-contained subassembly. As such, the circuit breaker 40, the marine receptacle 42, and the bussing assemblies 44,46 are cooperatively contained by (e.g., housed within, enclosed by, and/or located within) the enclosure member 32, the door members 34,36, and the backpan 38. Accordingly, installation of the switching assembly 30 into the electrical system 2 generally requires only connecting the conductor 8 (FIG. 1) to the bus block 52 and connecting the conductor 10 (FIG. 1) to one of the bus members 48. Prior art assemblies (not shown) including circuit breakers and electrical receptacles are not self-contained, and as such, require additional burdensome connections to be made (e.g., additional wiring to the circuit breakers). That is, rather than requiring a connection with time-consuming precise torque to be made when landing a conductor onto a conventional circuit breaker lug, the line side of the circuit breaker 40 can quickly and easily be plugged onto or unplugged off of one of the stabs 50.

Accordingly, it will be appreciated that the disclosed concept provides for an improved (e.g., self-contained, less burdensome to install, better protected against moisture ingress, able to provide strain relief) electrical system 2 and switching assembly 30 therefor.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A switching assembly comprising: an enclosure member; a backpan coupled to said enclosure member; an electrical switching apparatus coupled to said enclosure member; an electrical receptacle electrically connected to said electrical switching apparatus; and a bussing assembly comprising a number of stabs, said electrical switching apparatus being coupled to at least one of said number of stabs by a plug-on connection-; and a first door member and a second door member each pivotably connected to said enclosure member, said first door member overlaying said electrical switching apparatus in order to provide access thereto, said second door member overlaying said electrical receptacle in order to provide access thereto, said first door member having a first center point structured to open in a first plane, said second door member having a second center point structured to open in a second plane substantially coplanar with the first plane, wherein said enclosure member, said backpan, said electrical switching apparatus, and said electrical receptacle are structured so as to form a self-contained sub-assembly; wherein said backpan comprises a mounting surface disposed in a third plane; wherein said electrical receptacle comprises an interface surface disposed in a fourth plane; and wherein the fourth plane is disposed at an angle of between 30 degrees and 60 degrees with respect to the third plane.

2. The switching assembly of claim 1 further comprising a gasket member engaging said enclosure member and said backpan in order to provide a seal therebetween.

3. The switching assembly of claim 1 further comprising another bussing assembly; and wherein another bussing assembly said comprises a number of bus members electrically connected to said electrical receptacle.

4. The switching assembly of claim 3 wherein said bussing assembly further comprises a bus block and a number of jaw members; wherein said bus block is coupled to said backpan; and wherein each of said number of jaw members is mechanically coupled to at least one of said number of stabs of said bussing assembly.

5. The switching assembly of claim 3 wherein said number of bus members of said another bussing assembly are coupled to said backpan.

6. The switching assembly of claim 3 further comprising a gasket member engaging said enclosure member and said backpan in order to provide a seal therebetween; wherein said gasket member is annular-shaped; and wherein said bussing assembly and said another bussing assembly are disposed internal with respect to said gasket member.

7. The switching assembly of claim 1 wherein said electrical switching apparatus is a one-pole circuit breaker; and wherein said electrical receptacle is a twist-lock marine receptacle.

8. An electrical system comprising: a first customer interface; a second customer interface; and a switching assembly comprising: an enclosure member, a backpan coupled to said enclosure member, an electrical switching apparatus coupled to said enclosure member and being electrically connected to said first customer interface, an electrical receptacle electrically connected to said electrical switching apparatus and said second customer interface, and a bussing assembly comprising a number of stabs, said electrical switching apparatus being coupled to at least one of said number of stabs by a plug-on connection, and a first door member and a second door member each pivotably connected to said enclosure member, said first door member overlaying said electrical switching apparatus in order to provide access thereto, said second door member overlaying said electrical receptacle in order to provide access thereto, said first door member having a first center point structured to open in a first plane, said second door member having a second center point structured to open in a second plane substantially coplanar with the first plane, wherein said enclosure member, said backpan, said electrical switching apparatus, and said electrical receptacle are structured so as to form a self-contained sub-assembly; wherein said backpan comprises a mounting surface disposed in a third plane; wherein said electrical receptacle comprises an interface surface disposed in a fourth plane; and wherein the fourth plane is disposed at an angle of between 30 degrees and 60 degrees with respect to the third plane.

9. The electrical system of claim 8 wherein said switching assembly further comprises a gasket member engaging said enclosure member and said backpan in order to provide a seal therebetween.

10. The electrical system of claim 8 wherein said switching assembly further comprises another bussing assembly; and wherein said another bussing assembly comprises a number of bus members electrically connected to said electrical receptacle.

11. The electrical system of claim 10 wherein said bussing assembly further comprises a bus block and a number of jaw members; wherein said bus block is coupled to said backpan; and wherein each of said number of jaw members is mechanically coupled to at least one of said number of stabs of said bussing assembly.

12. The electrical system of claim 11 wherein said electrical system further comprises a first conductor and a second conductor; wherein said first conductor electrically connects said first customer interface to said bus block; and wherein said second conductor electrically connects said second customer interface to one of said number of bus members of said another bussing assembly.

13. The electrical system of claim 10 wherein said number of bus members of said another bussing assembly are coupled to said backpan.

14. The electrical system of claim 10 wherein said switching assembly further comprises a gasket member engaging said enclosure member and said backpan in order to provide a seal therebetween; wherein said gasket member is annular-shaped; and wherein said bussing assembly and said another bussing assembly are disposed internal with respect to said gasket member.

15. The electrical system of claim 8 wherein said electrical switching apparatus is a one-pole circuit breaker; wherein said electrical receptacle is a twist-lock marine receptacle; and wherein said second customer interface is a feeder panel.

* * * * *